United States Patent

Kohl

[11] Patent Number: 5,289,613
[45] Date of Patent: Mar. 1, 1994

[54] CORD END COVER

[76] Inventor: Michael L. Kohl, 1695 W. Bakerview Rd., Bellingham, Wash. 98226

[21] Appl. No.: 835,240

[22] Filed: Feb. 12, 1992

[51] Int. Cl.⁵ .............................................. F16G 11/00
[52] U.S. Cl. ..................................... 16/108; 24/136 R
[58] Field of Search ............ 16/108; 24/114.5, 115 A, 24/136 R, 537

[56] References Cited

U.S. PATENT DOCUMENTS

| | | |
|---|---|---|
| 716,877 | 12/1902 | Durand . |
| 1,288,438 | 10/1918 | Boomer . |
| 1,297,615 | 3/1919 | Voss et al. . |
| 1,392,339 | 10/1921 | Kelly . |
| 1,401,494 | 12/1921 | Rhorer et al. .................... 24/136 R |
| 1,402,341 | 1/1922 | Chaffee . |
| 1,420,632 | 6/1922 | Kelly . |
| 1,573,737 | 2/1926 | Norman . |
| 1,644,311 | 10/1927 | Davis et al. . |
| 1,793,882 | 2/1931 | Yanchenko . |
| 3,088,702 | 5/1963 | Orenick et al. . |
| 3,918,120 | 11/1975 | Yoshikawa ............................. 16/108 |
| 4,205,417 | 6/1980 | Mackal ................................. 24/260 |
| 4,368,999 | 1/1983 | Morel ................................. 24/537 X |
| 5,170,538 | 12/1992 | Zarembo ........................... 24/136 R |

Primary Examiner—Mark Rosenbaum
Assistant Examiner—S. Thomas Hughes
Attorney, Agent, or Firm—Hughes & Multer

[57] ABSTRACT

An end cover for a cord comprises a clinch, a pull member, and a cap. The clinch grips a side portion of an end portion of the cord. The pull member has a handle so that the handle is able to be pulled to pull the cord into the cap, with the clinch engaging the side portion, whereby the end cover is retained on the end portion.

20 Claims, 4 Drawing Sheets

CORD END COVER

The present invention relates generally to cord end covers and methods pertaining thereto.

BACKGROUND ART

The strands of a strand-type rope that has been cut will often unravel and become frayed, and similarly other types of cord ends will often fray. This fraying is sometimes remedied by tying the strands together to prevent unraveling, or by burning or melting the cord end, which acts to hold the strands together.

Also known are cord end covers which are inserted over, and are retained on, the end of the cord in a manner to prevent the unraveling and fraying of the cord. A search of the U.S. Patent literature has developed the following patents:

U.S. Pat. No. 4,205,417—Mackal, shows a device to hold a valve of a particular type of catheter (a "balloon" catheter) in place. This device comprises an outer sleeve in which fits an inner sleeve having fingers which are pushed inwardly as the inner sleeve is pushed into the outer sleeve.

U.S. Pat. No. 3,918,120—Yoshikawa, shows a two-part cable end, comprising a body part that fastens to the cable, and a clamping ring that fits around the body part.

Figures 6, 7:
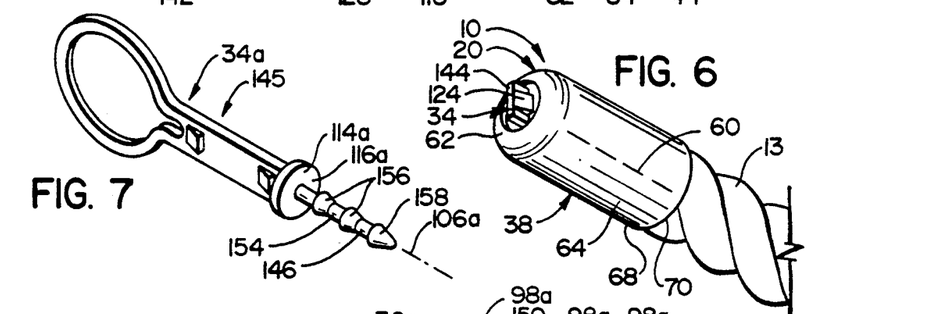
FIG. 6 is a perspective view of a finished rope end cover formed by the pull-clinch-rope enclosed by the cap.
FIG. 7 is a perspective view of a modified pull of a second embodiment of the present embodiment.

U.S. Pat. No. 3,088,702—Orenick et al., shows a cable fastener with arms (FIG. 6).

U.S. Pat. No. 1,793,882—Yanchenko shows an electric cable securing device comprising an inner sleeve (shown in FIGS. 3 and 4) and an outer sleeve (shown in FIGS. 1 and 2). The inner sleeve is inserted over an interior portion of the cable, and the inner sleeve is surrounded and locked by the outer sleeve, which in turn is inserted in a hole in a wall of an electric junction box, so that of the electrical cable is held in place.

U.S. Pat. No. 1,644,311—David, shows another electric cable securing device in which an inner member is locked in place on a cable by an outer sleeve.

U.S. Pat. No. 1,573,737—Norman, shows an inner sleeve 2 (FIG. 4) having some toothed fingers 3. The end of the rope is fed into the inner sleeve, 2, and an outer sleeve 8 is slid over the inner sleeve 2 containing the rope so that the fingers 3 are compressed against the rope.

U.S. Pat. No. 1,420,632 and U.S. Pat. No. 1,392,339, both by Kelly, show cord tips comprising an inner clamping member locked in place by an outer sleeve. In the Kelly '339 patent, the inner clamping member comprises multiple legs that have inwardly pointing teeth to better clamp the cord end. Additionally in the Kelly '339 patent, there is a barbed central spike member 11a that enhances retention of the cord.

U.S. Pat. No. 1,402,341—Chaffee, shows a lace tip which includes an inner multi-legged member that is held in place by an outer sleeve.

U.S. Pat. No. 1,297,615—Voss et al., shows a hollow cap inside which the rope end is inserted.

U.S. Pat. No. 1,283,438—Boomer, shows another type of cap.

U.S. Pat. No. 716,877—Durand, shows a rope tip that is held in place by a screw.

SUMMARY OF THE INVENTION

The present invention is directed at providing a cover for an end portion of a cord, such as a rope or a wire. An apparatus of the present invention comprises a cap, a pull, and a clinch, that is able to grip the sides of the end portion of the cord.

In a first preferred embodiment, the pull member is able upon receiving an external force, to cause the clinch to grip the cord and to cause the end portion of the cord to become inserted inside the cap, in a manner that the apparatus is retained on the cord. The clinch comprises a plurality of outwardly extending arms that are able to grip the cord. The pull member acts through the clinch to force the end portion of the cord inside the cap. The pull member also acts to fasten the engaging member to the outer member.

In the first preferred embodiment, the pull member comprises a handle portion which is able to pass through a hole in the cap. The pull member further comprises a foot portion, which serves to pull the clinch, and a catch, which prevents the pull from withdrawing from the cap.

In the first preferred embodiment, a first portion of the pull member remains in a finished cord end cover and a second portion of the pull member is discarded.

In a second preferred embodiment, a spike member is added to the pull member to enhance gripping with the end portion of the cord.

In the third preferred embodiment, the pull has a pointed tip and has a shaft configuration, and the cap has a forwardly facing snap cone structure containing a round hole through which the pull is able to be drawn.

A method of the present invention comprises the steps of providing the pull member, the cap, and the clinch, and applying force to the pull member in a manner to cause the clinch to grip the cord end portion and to cause the cord end portion to become inserted inside the cap.

DESCRIPTION OF THE PREFERRED EMBODIMENT

1. The First Embodiment

Figures 1, 2, 3:
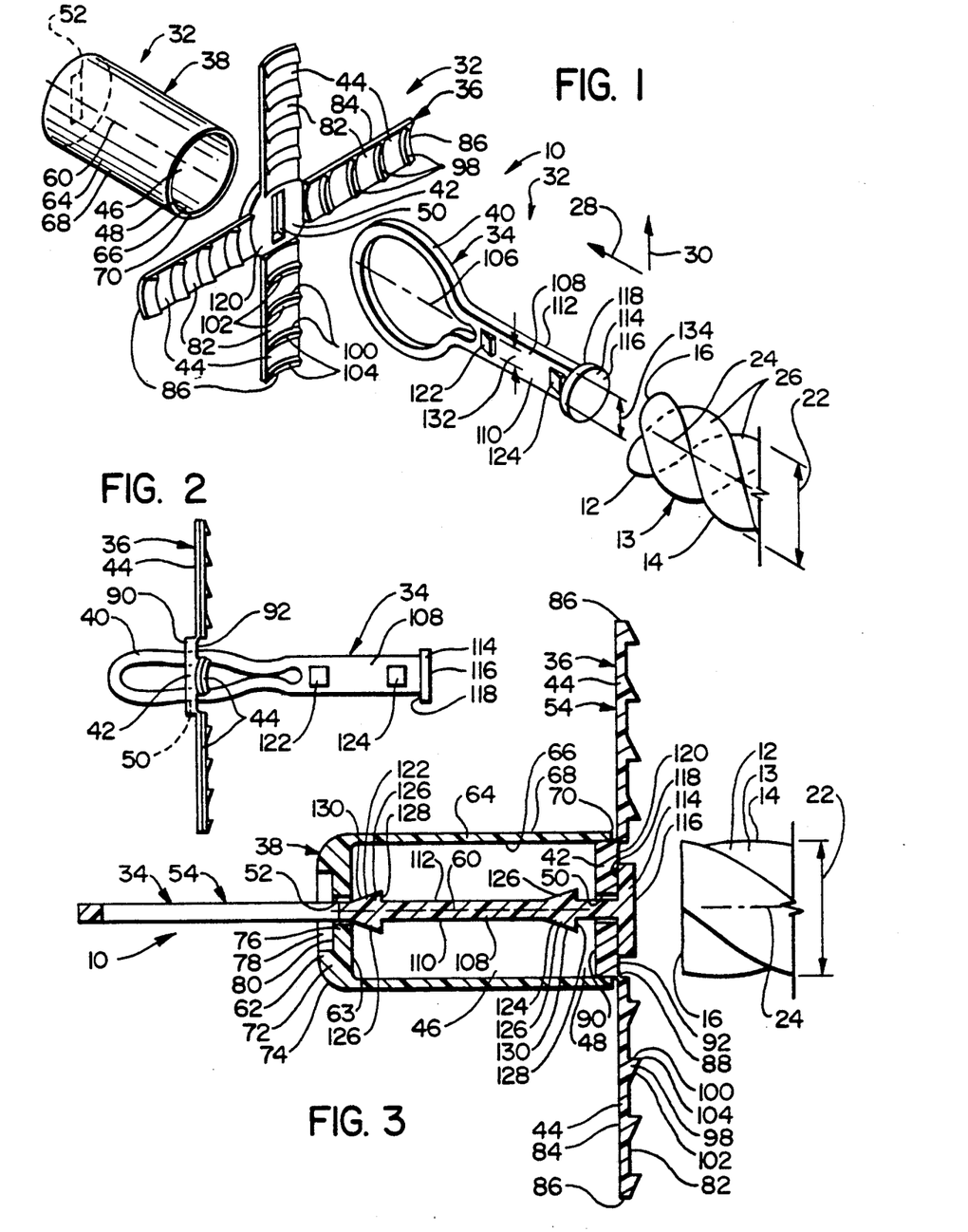
FIG. 1 is a perspective view of (from right to left) a rope end, and three parts of the present invention, namely, a pull member, a clinch with arms spread apart, and a cap, prior to the assembling of the parts.
FIG. 2 is a side view of the clinch with the pull partly inserted in the clinch.
FIG. 3 is a section looking from above wherein the pull is inserted in the clinch to form a pull-clinch and the pull-clinch is partly inserted in the cap.

A first embodiment of apparatus of the present invention 10 is shown in perspective in FIG. 1 and is able to be closed onto an end portion 12 of a rope 13. This rope end portion 12 has a side surface 14 and a front end 16, which can be formed, for example by cutting the rope.

The rope 13 has a width dimension 22 and an imaginary lengthwise rope axis 24. As shown herein the rope is a strand type rope formed by a plurality of strands 26 that are twisted together. As used herein the terms "forward", "forwardly", and the like refer to a leftward direction in FIG. 1 as indicated by an arrow 28, while l the terms "rearward", "rearwardly", and the like denote the opposite; terms such as "up" and "upwardly" refer to an upward direction in FIG. 1 indicated by an arrow 30, while terms such as "down" and "downwardly" denote the opposite.

The present invention 10, shown prior to snapping-on in FIG. 1, comprises three parts, namely a pull member 34, a clinch 36, and a sleeve or cap 38. The pull 34 comprises a collapsible handle or loop 40, while the clinch 36 comprises a central body 42 from which four identical foldable arms 44 (shown in a spread apart position) extend outwardly, and the cap 38 defines a smooth inside chamber 46 with an open end 48.

The clinch 36 and the cap 38 have, respectively, a clinch slot 50 and a cap slot 52 which are identical. As seen in the side view of FIG. 2, the pull 34 is able to be inserted loop first into the clinch slot 50 (the loop 40 collapsing as shown), and to be pulled by hand until as illustrated in the overhead section view of FIG. 3, the pull 34 is fully inserted into the clinch 36 so that a pull-clinch 54 is formed by the pull 34 and the clinch 36. The pull-clinch 54 is able to be inserted loop first into the cap slot 52, and the central body 42 of the pull-clinch 54 is able to fit into the open end 48 of the cap 38.

Figure 4:
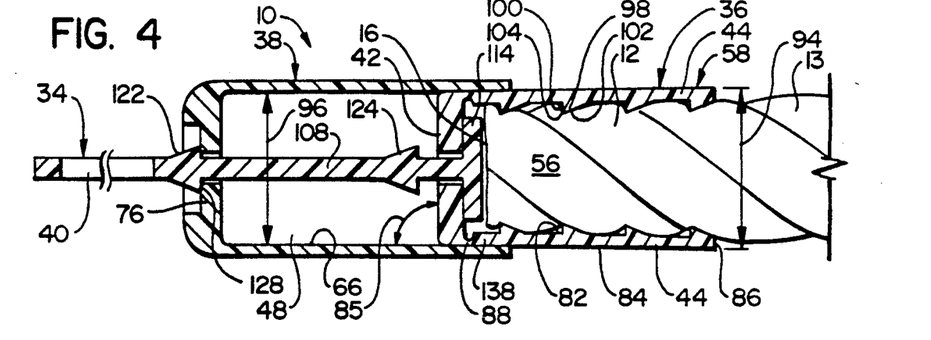
FIG. 4 is a view like FIG. 3 but the arms of the pull-clinch which are closed, grip the rope end to form a pull-clinch-rope and the pull-clinch-rope is drawn part way into the cap.
Figure 5:
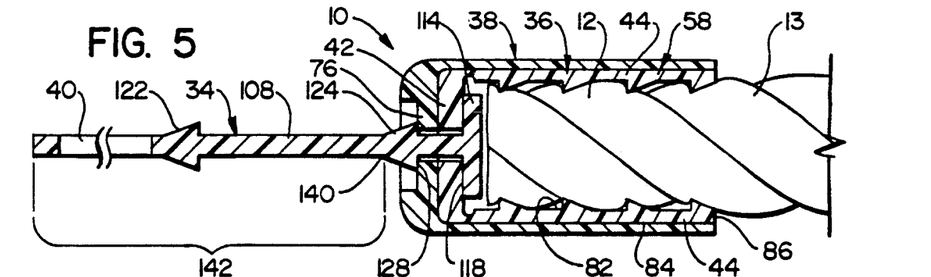
FIG. 5 is a view like FIGS. 3 and 4 but the pull-clinch-rope is drawn all the way into the cap.

As shown in the next section of FIG. 4, the arms 44 of the clinch 36 are able to be folded around the rope end portion 12 to grasp or clinch the rope portion 12 within a rope receiving area 56 defined by the arms 44, and to form a pull-clinch-rope 58 (comprising the pull 34, the clinch 36 and the rope portion 12) which fits in the inside chamber 46 of the cap 38. As shown in FIG. 5, the pull-clinch-rope 58 is able to be pulled by hand completely into, and then to be retained in, the cap 38, so as to enable the cover 20 of FIG. 6 to be formed and finished as is explained below.

The structures of the cap 38, the clinch 36, and the pull 34, are now described in detail.

The cap 38 as shown in FIG. 3 has an imaginary central cap axis 60 indicated with a dashed line, and comprises a front wall 62 defining an inside surface 63 and a cylindrical shell 64 defining an inside surface 66, an outside surface 68, and, at a rear end of the shell, an annular lip 70. The front wall 62 has an annular thick portion 72 which defines a shoulder 74 and a central thin portion 76 which contains the cap slot 52 and which defines a cylindrical recess 78 having a circular forwardly facing surface 80. (it is believed to be of help to look also at FIG. 6, which shows most of this structure in perspective).

Turning to the clinch 36, each of the arms 44 (FIG. 3) of the clinch 36, have an inner surface 82, an outer surface 84, and an outer end 86. Each arm 44 is connected by a narrow hinge portion 88 to the central body 42 (which has a front 90 and a back 92). These hinge portions 88 permit movement of the arms 44 between the clinch's spread apart position (FIG. 30, and its inwardly folded position (FIG. 4) in which the arms 44 enclose and engage the rope end portion 12 on four sides. In the positions of FIGS. 4 and 5, the outer surfaces 84 of the arms 44 form essentially a right angle 85 with the central body 42 in a manner that a width dimension 94 defined by the outer surfaces 84 equals a width 96 of the central body 42, so that the pull-clinch-rope 58 fits snugly inside the chamber 46 of the cap 38.

Each arm 44 is curved (as shown in FIG. 1) so as to match the curve of the inside surface 66 of the cap 38. The inner surface 82 of each arm 44 has four identical ridges 98 which project inwardly from the inner surface 82. As can be seen in FIG. 4, each ridge 98 comprises a perpendicular face 100 which is perpendicular to the inner surface 82 and a rearwardly inwardly sloping face 102, the faces 100 and 102 converging at an edge 104. As shown in FIG. 1, the ridges 98 are arranged so that the edge 104 of each ridge 98 is at a right angle to a length of its related arm 44. When the arms 44 are folded in the position of FIG. 4, the ridges 98 project into the rope body 13 and the ridges 98 are effectively cover a substantial fraction (for example more than half) of a circumference of the rope body 13.

The pull 34 as shown best in FIG. 1 has an imaginary pull axis 106. Centered on the pull axis 106 is the loop 40 which is connected to an elongated flat neck portion 108 (centered on the axis 106) having first and second sides 110 and 112, and the neck portion 108 is connected to an enlarged circular foot portion 114 (also centered on the axis 106) that projects laterally on both sides of the pull 34 and defines a back 116 and forwardly facing catch surfaces 118 (also seen in FIG. 3). The diameter of the loop 40 is sufficiently large to permit the person who is using the present invention 10 to slip the person's fingers through the loop 40 and thereby to grab the loop 40 for pulling, but the loop 40 is sufficiently small to permit the loop 40 to be threaded through the clinch slot 50 and then through the cap slot 52.

The neck portion 108 also fits through the slots 50 and 52. However, after the pull 34 is pulled forwardly through the clinch slot 50, and once the catch surface 118 abuts a rear face 120 (FIG. 1) of the central body 42 of the clinch 36, the pull 34 is prevented from moving any further forwardly through the clinch slot 50.

Formed on both sides 110 and 112 of the neck portion 108 of the pull 34 as shown in FIG. 3 are a forward catch 122 and a rear catch 124, each catch 122 and 124 comprising a pair of wedges 126. Projecting outwardly from the neck portion 108, each wedge 126 includes a rear perpendicular catch surface 128 and a forward sloping wedge face 130 which slants rearwardly and outwardly. As shown best in FIG. 1, the catches 122 and 124 each have a height 132 which is less than a height 134 of the neck portion, and are centered on the pull axis 106. The pull 34 and its catches 122 and 124 are able to be pulled forwardly through the two slots 50 and 52. However, once a catch 22 or 124 is past a slot, the perpendicular surfaces 128 of the catch prevents the pull from being withdrawn through the slot.

The catches 122 and 124 have specific positions on the neck portion 108 relative to the outer parts of the pull 34. As shown in FIG. 5, the rear catch 124 is positioned so that its perpendicular surfaces 128 are displaced from the catch surfaces 118 of the foot portion 114 by a distance that is equal to the combined thicknesses of the central body 42 (of the clinch 36) and of the central thin wall portion 76 (of the cap 38), whereby the clinch 36 is able to be clamped securely to the cap 38 by the pull 34. As shown in FIG. 3, the forward catch 122 is positioned in a manner that when the pull 34 and clinch 36 are assembled as pictured, and after the central body 42 enters the open end 48 of the cap 38, entry of the forward catch 122 into the cap slot 52 is imminent.

All the parts 32 of the present invention 10 are made of plastic or some material which will yield moderately to permit, for example, the collapsing of the loop 40, the inbending of the hinge portions 88, and the passing of the catches 122 and 124 forwardly through the slots 50 and 52.

In operation, let us first assume that it is desired to preassemble the pull 34 and clinch 36 to form the pull-clinch 54 prior to the present invention 10 being needed for snapping-on, so that a supply of the pull-clinches 54 is on hand for use. Initially, the loop 40 is collapsed by squeezing, and the forward end of the loop 40 is threaded through the clinch slot 50.

As the loop 40 is pulled forwardly beyond the position of FIG. 2, the catches 122 and 124 each pass through the slot 50, and the catch surface 118 of the foot portion 114 stops against the back 92 of the clinch 36. The pull-clinch 54 is prevented from coming apart by the fact that the two opposed surfaces, namely, the catch surface 118 and the rear perpendicular surface 128, prevent the pull 34 from being withdrawing either forwardly or rearwardly from the clinch slot 50. The pull-clinch 54 is able to be stored in this form.

Assuming now that the rope body is cut and that the rope end 16 needs a cover treatment to prevent its strands 26 from unraveling, the pull-clinch 54 and the cap 38 are gathered for assembly, and the loop 40 of the pull-clinch 54 is pulled forwardly through the cap slot 52 to the position of FIG. 3 where the loop 40 protrudes forwardly from the cap slot 52, and the annular lip 70 of the cap 38 practically reaches the hinge portions 88 of the clinch 36.

The back 118 of the pull-clinch 54 is brought against the rope end 16, and the pull-clinch 54 is centered on the rope-wise axis 24 of the rope 13. Some or all of the fingers of one hand, let us say the left hand, of the person who is using the present invention 10 are inserted through the loop 40.

The right hand, let us say, is wrapped around the shoulder 74 and around the shell 64 of the cap 38, and at the sam time is used to fold the arms 44 around the rope end portion 12 and to squeeze the arms 44 inwardly so that the inner surfaces 82 of the arms 44 grip the sides 14 of the rope end portion 12. The friction of the arms 44 with the portion 12 is enhanced by the forwardly facing perpendicular faces 100 pressing into, and holding the rope, and due to this friction the rope end portion 12 is retained in the rope receiving area 56, and the pull-clinch-rope 58 is formed.

At this time, two pulling steps are performed. In a first step, while the person is pulling forwardly on the loop 40 with the left hand and pushing rearwardly on the cap 38 with the right hand, the cap 38 is slid rearwardly to the position of FIG. 4 where the pull-clinch-rope 58 has entered the inside chamber 46 of the cap 38 part of the way, and the forward catch 122 has passed through the cap slot 52 so that the perpendicular surface 128 of the forward catch 122 prevents withdrawal of the pull-clinch-rope 58 from the open end 48 of the cap 38 and so that the pull-clinch-rope 58 is compressed at 138 by the cap 38.

In a second pulling step, the hands of the person continue pulling the loop 40 leftwardly and pushing the cap 38 rightwardly until the rear catch 124 wedges forwardly through the cap slot 50, and the pull-clinch-rope 58 is fully inserted in the inside chamber 46 of the cap 38 with the surfaces 63 and 90 abutting, and the pull-clinch-rope 58 is retained by the clamping action of the opposing surfaces 118 and 128 clamping together on the thin portion 76 (of the cap 38) and the central body 42 (of the clinch 36). Due to the cap 38 pressing inwardly on the ridged arms 44 which press inwardly on the rope end portion 12, the rope body 13 is permanently retained in the present invention 10.

If it is desired to form the finished end cover 20 as pictured in FIG. 6, a forwardly extending protruding portion 142 (seen in FIG. 5) of the neck portion 108 of the pull 34 is trimmed at 140 and is discarded, so as to form and to leave a front exposed surface 144 of the pull 34. Alternatively, the portion 142 is able to be left alone so that it is kept on the present invention 10, and in this case the loop 40 which protrudes at the forward end of the rope body 13 is used for various purposes such as hanging of the rope body 18 around a peg or the like.

If circumstances, such as thickness or hardness of the rope body 13 render pulling hard during the snapping-on operation, the effort of pulling is eased in the present invention 10 by the fact that pulling is performed in the two steps (FIGS. 4 and 5). In the first step, which is often harder to perform than the second step, the effort is minimized by the fact that the pull-clinch-rope 58 need be pulled only a fraction of the length along the inside chamber 46 of the cap 38 before the forward catch 122 passes through the cap slot 50 and catches.

Let us recapitulate some of the main features described in the first embodiment. The present invention 10 has the pull 34 which is able to be combined with the clinch and the rope body 13 to form the pull-clinch-rope 58, which is able to be pulled forwardly into, and retained permanently in, the cap 38. The pull 34 enables the person to pull the rope in a direction which is away from the rope body 13. While the ridged arms 44 of the clinch 36 hold the rope, the rear catch 124 and the foot portion 114 of the pull 34 clamp the clinch 36 to the cap 38. The pull 34 includes a handle means, namely the loop 40, which also collapses so as to enable the pull 34 to be threaded through the clinch 36 and the cap 38.

2. The Second Embodiment

In describing a second embodiment 145 of the present invention (shown in FIGS. 7 and 8), components that are like those of the first embodiment will have the same numerical designations as before but with "a" added. The pull 34a which is shown in perspective in FIG. 7 has a rearwardly pointed spike member 146 which is centered on the pull axis 106a and fixedly mounted to the back 116a of the foot 114a of the pull 34a. In substantially all other respects, the structure of the second embodiment is identical to that of the first embodiment.

Figure 8:
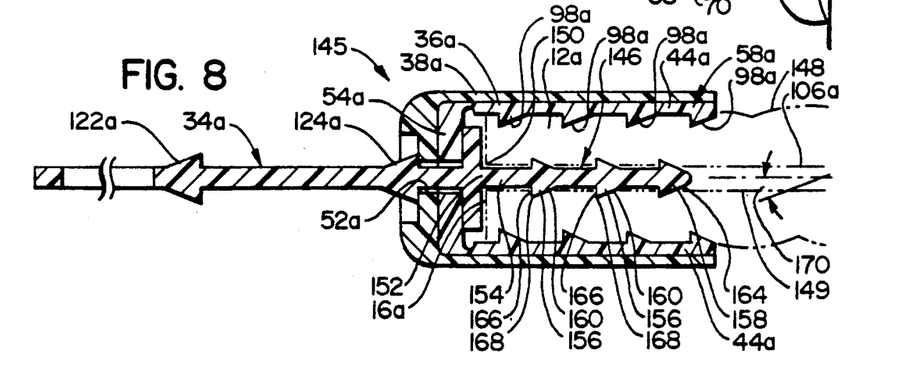
FIG. 8 is a section view like FIG. 5, with the pull-clinch-rope pulled completely into the cap, but this view is of the second embodiment.

The second embodiment is able to be used with a braided type of rope which is pictured in the section view (showing, similarly to FIG. 5, the next to final step of assembly), of FIG. 8, rather than the strand type of rope used with the first embodiment. This braided rope comprises an outer portion 148, which is made of braided rope fibers, and which defines an inner generally cylindrical hollow 149 having an end portion 150 (coextensive with the rope end portion 12a) which opens in an opening 152.

While the steps which are used in assembling the second embodiment to the rope end portion 12a are similar, or nearly identical, to those depicted in FIGS. 1-6, in the step that is similar to the one shown in FIG. 3, where the pull-clinch 54a is assembled within the cap 38a and where the apparatus is brought against the rope end 16a, the spike member 146 is able to be inserted through the opening 152 to substantially fill the end portion 150 of the hollow 149, so that during the subsequent steps (as in the FIGS. 4-6) the spike member 146 supports the outer braided portion 148 by providing along most of the hollow end portion 150 an outwardly directed force, which opposes the inward force of the clinch 36a (which is squeezed by the person's fingers and by the cap 38a) against the exterior of the rope. In this manner the retention of the second embodiment on the rope end portion 12a is assured.

To describe this spike 146 in greater detail, as shown in FIG. 8 the spike 146 comprises a central shaft portion 154 that in the position of FIG. 8 extends substantially the length of the hollow end portion 150 and that has two identical ridge portions 156 and ends and a rearward pointed portion 158. These ridge portions 156, which project outwardly from the shaft portion 154, each comprise a conically shaped forwardly, outwardly sloping surface 160, while the pointed portion 158 comprises a generally conical surface 164.

The portions 156 and 158 each have identical annular surfaces 166 which are perpendicular to the central axis 106a, and each define circular edges 168 which are concentric with the axis 106a and which are pictured as being, although the circular edges 168 need not be, of equal diameter. The portions 156, and 158 each define with their respective sloping surfaces, (160 and 164) an identical slope angle 170 (as for example about 30°) which is formed with the axis 106a.

To describe the operation in detail, as in the first embodiment, the pull 34a is preassembled with the clinch 36a to form the pull-clinch 54a which is assembled with the cap 38a in the manner shown in FIG. 2. Let it be assumed that the rope end portion 12a which as been cut needs a covering treatment. The spike 146 is inserted through the opening 152 into the cylindrical hollow 149 and the back 116a of the pull-clinch 54a is brought against the rope end 16a.

As in the first embodiment, the steps are performed (i) where the person uses two hands to form the pull-clinch rope 58a with the arms 44a being folded around the rope end portion 12a, (ii) where the forward catch 122a of the pull-clinch-rope 58a is passed through the cap slot 52a (as in FIG. 4), and (iii) where the rear catch 124a is passed through the cap slot 52a as shown in FIG. 8, permanently securing the rope in the apparatus of the second embodiment.

However, in the second embodiment, the spike 146 with its forwardly directed sloping surfaces 160 and 164 exerts pressure outwardly on the rope body, so that the rope body is squeezed and gripped between the spike 146 with its outwardly directed ridges 156 and 158, and the arms 44a with their inwardly directed ridges 98a.

The spike 146 prevents the rope body from collapsing inwardly when the second embodiment is snapped on. Finally, as in the first embodiment, the finished rope end cover is able to be formed by trimming the pull 34a in the manner of the first embodiment.

3. Third Embodiment

In a third embodiment 178 (shown in FIGS. 9-13), components that are like those of the previously described embodiments will have the same numerical designations, but with "b" added. The pull member 34b is modified from the previous embodiments, and comprises a central shaft 180 connected with the foot portion 114b, modified front and rear catches 182 and 184, respectively, and a tip 186 at a forward end of the pull 34b. In the third embodiment, the front end of the cap 38b instead of being recessed is modified to comprise a wall portion 188 with a shoulder 74b and a forwardly projecting expandable snap cone portion 190, and the cap slot (52 and 52a) of the previous embodiments is replaced by a cap hole 192 (shown best in FIG. 12) having a straight portion 194 and a tapered portion 196 defined in the front end of the cap 38b, while the clinch slot (50 and 50a) of the previous embodiments is replaced by a circular clinch hole 198.

Figures 9, 10:
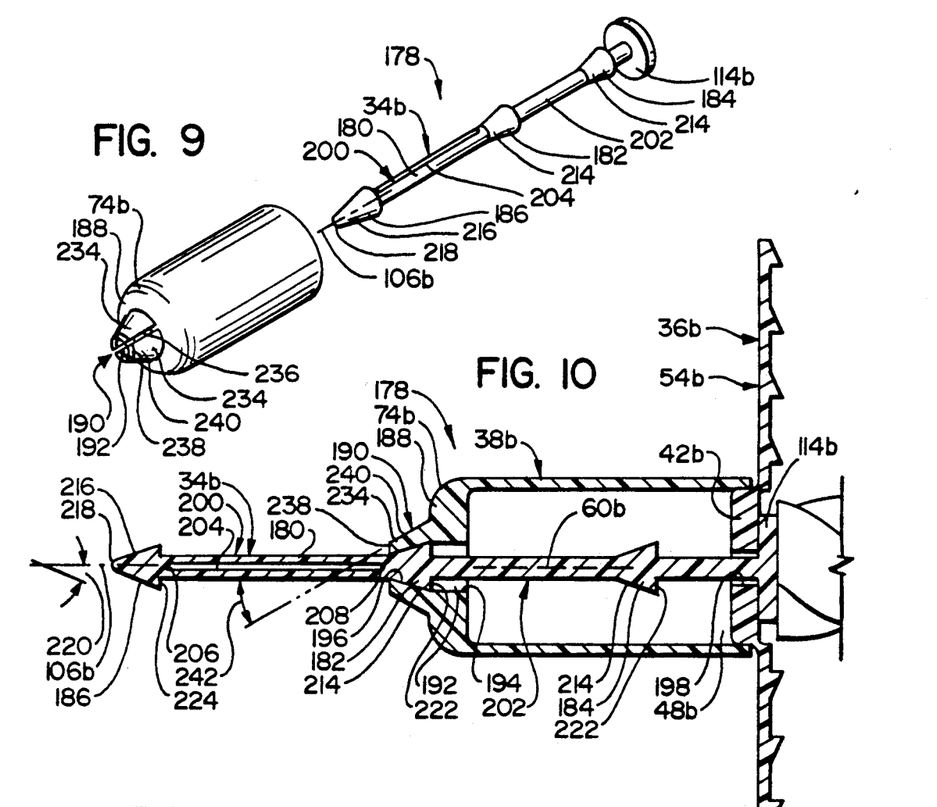
FIG. 9 is a perspective view of a pull and a cap of a third embodiment (the clinch not being shown in the view)
FIG. 10 is a section view generally corresponding to FIG. 3 with the pull-clinch partly inserted in the cap, but this view is of the third embodiment.
Figure 11:
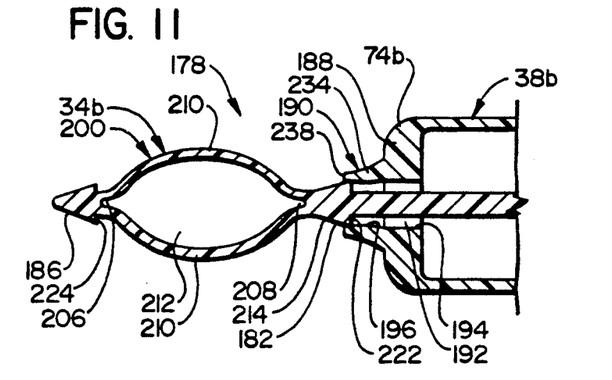
FIG. 11 is a section view detailing a front portion of the third embodiment, and showing how a snap cone which is formed in the front end of the cap is forced into an expanded position as the pull passes forwardly through the snap cone.

As in the first embodiment, the third embodiment is used with the strand type of rope, and the spike (146) of the second embodiment is not used. As shown in FIGS. 10 and 11, the pull 34b has a front handle portion 200 and a rear portion 202, and the handle portion 200 and contains a slit 204 running from a rounded front slit end 206 to a rounded rear slit end 208 which enables the handle portion 200 to divide into half shaft portions 210 which are able to be spread apart (as shown in somewhat exaggerated fashion for clarity in FIG. 11) by the person who is using the third embodiment, to define a finger receiving area or loop 212 which, in the snapping-on operation (shown in FIGS. 10-13), functions analogously to the loop (40,40a) of the previous embodiments, as is explained below.

Figure 13:
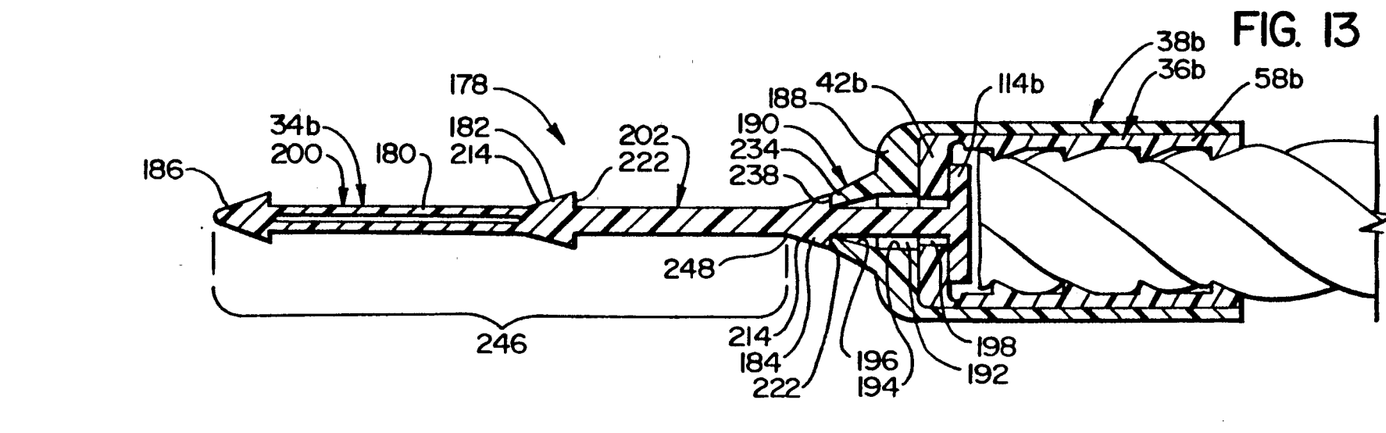
FIG. 13 is a view generally corresponding to FIGS. 5 and 8, but of the third embodiment.

The catches 182 and 184 are able to function similarly to the catches (122, 122a) and (124, 124a) of the previous embodiments, in that the catches 182 and 184 are able to pass forwardly but not rearwardly through the holes 192 and 198. The tip 186 is smaller than the catches 182 and 184. In formation of the pull-clinch 54b the rear catch 184 and the foot portion 114b prevent the clinch 36b from being withdrawn either forwardly or rearwardly from the pull 34b. In the pulling of the pull-clinch-rope 58b into the cap 38b (as shown in FIG. 13), the foot portion 114b is able to hold onto the clinch 36b, and the catches 182 and 184 which pass forwardly through the cap hole 192 are able to prevent the withdrawal of the pull-clinch-rope 58b, so that the clinch 36b is able to become clamped to the front end of the cap 38b by the clamping action of the rear catch 184 and the foot portion 114b.

As seen in FIGS. 9 and 10 the catches 182 and 184 each have identical rearward sloping conical surfaces 214, and the tip 186 has an outwardly rearwardly sloping conical surface 216 and a somewhat rounded point 218, with these conical surfaces 214 and 216 each forming the same angle 220, such as for example 20°, with the pull axis 106b. The catches 182 and 184 also have identical annular surfaces 222, and the tip 186 has an annular surface 224, with these annular surfaces 222 and 224 being perpendicular to the central axis 106b.

As seen in FIG. 10, a width of the tip 186 is such that the tip 186 readily passes through the clinch hole 198. The catches 182 and 184 have widths identical to one another which are somewhat greater than a diameter of the clinch hole 198, but due to the moderately yielding and resilient characteristic of the material of which the parts 326 are formed the catches 182 and 184 are able to be forced forwardly through the clinch hole 198.

Performing a function similar to that of the cap slot (52 and 52a) of the previously described embodiment, the cap hole 192 is able to allow the catches 182 and 184 to pass forwardly, but not rearwardly. However, the cap hole 192 with its snap cone 190 arranged to have a particular action that is unique to the third embodiment. In this connection, the snap cone 190 has a rest position (shown in FIG. 10) which the snap cone 190, being of a resilient material, assumes naturally and in which the snap cone 190 has its minimum diameter, and an expanded position (seen in FIG. 11) in which the sides of the snap cone 190 are forced by the catches 182 and 184 to pivot outwardly to a maximum diameter, so as to allow the catches 182 and 184 to pass forwardly through the tapered portion 196 of the cap hole 192.

As seen in FIG. 9, the snap cone 190 is formed of four identical quarter cone portions 234 which are divided by spaces 236 and which are integral with the front wall portion 188 of the cap 38b. On their exteriors, the portions 234 define a front facing stop surface 238 and a tapered conical surface 240, that, in the snap cone's rest position, makes an angle 242 (which is an angle such as 30°) that is greater than the angle 220 with the central cap axis 60b.

Figure 12:
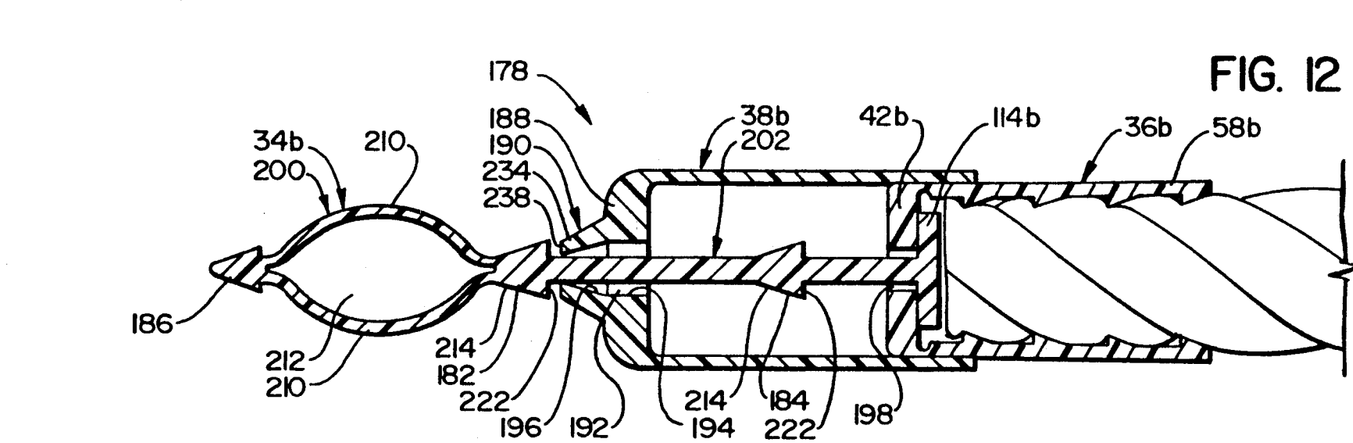
FIG. 12 is a view similar to FIG. 4, but of the third embodiment.

In the rest position of the snap cone 190, as seen in FIG. 12, the stop surface 238 engages the annular surfaces 222 of the catches 182 and 184, and rearward movement of the catches 182 and 184 causes the quarter cone portions 234 to collapse inwardly and to lock so as to prevent rearward movement of the catches 182 and 184. The straight portion 194 of the cap hole 192 is defined by the wall 188 and has a width which equals the widths of the catches 182 and 184, while the tapered portion 196 of the cap hole is defined by the quarter cone portions 234 and in the snap cone's rest position is congruent with the conical surfaces 214 of the catches 184 and 186.

In a manner similar to that described in the previous embodiments, the rear catch 184 is located on the pull 34b in the manner shown in FIG. 3 a distance from the foot portion 114b equal to the thickness of the central body 42b and of the front end portion of the cap 38b, and the front catch 182 is located on the pull 34b in a manner that in the position of FIG. 10, where the central body 42b is in the mouth 48b of the cap 38b, the emergence of the front catch 182 forwardly through the tapered hole 196 is eminent.

In operation in assembling the pull-clinch 54b, the initial insertion of the handle portion 200 of the pull 34b into the clinch 36b is facilitated by the pointedness of the tip 186 and by the straightness of the handle portion 200 in its collapsed position. Once the handle portion 200 has passed through the clinch hole 198, the assembly of the pull-clinch 54b is completed as in the previous embodiments, namely, by holding the clinch 36b with one hand, looping the fingers through the loop 212, and pulling until both catches 182 and 184 have passed through the clinch hole 198.

In assembling the pull-clinch-rope 58b and in initially inserting the pull-clinch-rope 58b into the cap 38b as in FIG. 10, the insertion is again facilitated by the tip 186 and by the straight portion 194. Although the pulling of the pull-clinch-rope 58b into the cap 38b is done as in the previous embodiments in two steps, that is, while one hand grips the loop 212 and the other hand holds the arms 44b closed and holds onto the outside surface 68b and the shoulder 74b of the cap 38b pulling the loop first to the position of FIG. 12, and then to the position of FIG. 13, the difference in the third embodiment is that the catches 182 and 184 enter the cap hole 192 and move forwardly with minimum effort through the quarter cone portions 234 which, having their resilient characteristic and their spaces 236 yield readily to their expanded position as in FIG. 11, and then snap shut as in FIGS. 12 and 13 so as to position the stop surface 238 of the snap cone 190 directly behind the annular surface 222 of the catches 182 and 184 to prevent the withdrawal of the pull-clinch-rope 58 from the cap 38b.

The pull 34b has a trimmable portion 246 seen in FIG. 13 which is able to be trimmed at a location 248 to finish the rope end cover 20b as in the previously described embodiments.

It is to be understood that various modifications may be made to the foregoing described embodiment without departing from the basic teachings of the present invention.

What is claimed is:

1. An end cover assembly to cover an end of a cord, said assembly having a pull axis, and comprising:
   a) a clinch means comprising a central body portion having through slot means and arm means connected to said central body portion for inward gripping movement toward said pull axis;
   b) a sleeve means having a front and rear end, and defining an interior chamber arranged to receive therein said central body portion and engage said arm means to urge said arm means in said gripping movement toward said pull axis;
   c) a pull member having a forward manually engageable pull portion and a rear foot portion;
   d) said slot means of the body portion of the clinch means being configured relative to said pull portion and said foot portion so that when said pull portion is passed through said slot means, said foot portion is in abutting engagement with said clinch means,
   whereby said pull member can be moved into pulling engagement with said clinch means and moved forwardly through said sleeve means to urge said arm means in gripping movement toward the pull axis, with said assembly then covering said end portion of said cord.

2. The assembly as recited in claim 1, wherein said manually engageable pull portion comprises a loop portion defining a rearwardly facing engaging surface capable of pulling movement.

3. The assembly as recited in claim 2, wherein said looped portion comprises a closed loop.

4. The assembly as recited in claim 2, wherein said pull portion is flexible so as to be able to be moved into a smaller cross sectional configuration to be moved through said slot means and then being expanded for pulling engagement.

5. The assembly as recited in claim 1, wherein the forward end of said sleeve means has a through opening to receive said pull member, and said pull member is arranged with catch means which moves through the opening in the sleeve means and engages the sleeve means to prevent retraction of said pull member from said sleeve means.

6. The assembly as recited in claim 5, wherein said catch means comprises a catch member which is positioned relative to said sleeve means, in a manner that said catch member comes into engagement with said sleeve means when where said clinch means is in an initial entry position toward said sleeve means.

7. The assembly as recited in claim 5, wherein said catch means comprises a catch member which is positioned so as to come into securing engagement when said clinch means has moved into said sleeve means sufficiently far so that said arm means of the clinch means has moved into gripping engagement.

8. The assembly as recited in claim 7, wherein a forward portion of said pull member is detachable, in a manner that after said catch means is in securing engagement, the forward portion of said pull member is detachable from the remaining portion of the pull member so as to be removable therefrom, with the remaining secured portion of the pull member being engaged in said assembly.

9. The assembly as recited in claim 5, wherein said catch means comprises:
  a) a first catch member which is positioned relative to said sleeve means, in a manner that said catch member comes into engagement with said sleeve means when said clinch means is in an initial entry position toward said sleeve means; and
  b) a second catch member which is positioned to come into securing engagement when said clinch means has moved into said sleeve means sufficiently far so that said arm means of the clinch means has moved into gripping engagement.

10. The assembly as recited in claim 1, wherein said pull member has cord engaging means at a rear portion thereof arranged to come into pulling engagement with a cord end which is to be covered.

11. The assembly as recited in claim 10, wherein said cord engaging means is a spike means arranged to be inserted along said pull axis into said cord end.

12. An end cover assembly to cover an end of a cord, said assembly having a pull axis, and comprising:
  a) a clinch means comprising a central body portion and arm means connected thereto for inward gripping movement toward said pull axis;
  b) a sleeve means having a front and rear end, and defining an interior chamber arranged to receive therein said central body portion and engage said arm means to urge said arm means in said gripping movement toward said pull axis;
  c) a pull member having a rear connecting means for pulling said clinch means into said sleeve means, and a forward manually engageable pull portion comprising a loop means with an outwardly accessible rearwardly facing manually engageable surface permitting said loop means to be manually engaged after said loop means has been moved forwardly through said sleeve means with the clinch means attached thereto.

13. The assembly as recited in claim 12, wherein said loop means comprises a closed loop.

14. The assembly as recited in claim 12, wherein said pull portion is flexible so as to be able to be moved into a smaller cross sectional configuration to be moved through a slot means at a forward end of said sleeve and then being expanded for pulling engagement.

15. The assembly as recited in claim 12, wherein the forward end of said sleeve means has a through opening to receive said pull member, and said pull member is arranged with catch means which moves through the opening in the sleeve means and engages the sleeve means to prevent retraction of said pull member from said sleeve means.

16. The assembly as recited in claim 15, wherein said catch means comprises a catch member which is positioned relative to said sleeve means, in a manner that said catch member comes into engagement with said sleeve means when where said clinch means is in an initial entry position toward said sleeve means.

17. The assembly as recited in claim 15, wherein said catch means comprises a catch member which is positioned so as to come into securing engagement when said clinch means has moved into said sleeve means sufficiently far so that said arm means of the clinch means has moved into gripping engagement.

18. The assembly as recited in claim 17, wherein a forward portion of said pull member is detachable, in a manner that after said catch means is in securing engagement, the forward portion of said pull member is detachable from the remaining portion of the pull member so as to be removable therefrom, with the remaining secured portion of the pull member being engaged in said assembly.

19. The assembly as recited in claim 15, wherein said catch means comprises:
  a) a first catch member which is positioned relative to said sleeve means, in a manner that said catch member comes into engagement with said sleeve means when said clinch means is in an initial entry position toward said sleeve means; and
  b) a second catch member which is positioned so as to come into securing engagement when said clinch means has moved into said sleeve means sufficiently far so that said arm means of the clinch means has moved into gripping engagement.

20. The assembly as recited in claim 12, wherein said pull member has cord engaging means at a rear portion thereof arranged to come into pulling engagement with a cord end which is to be covered.

* * * * *